US 12,294,415 B2

(12) United States Patent
Ito et al.

(10) Patent No.: US 12,294,415 B2
(45) Date of Patent: May 6, 2025

(54) OPTICAL POWER SUPPLY SYSTEM, POWER RECEIVING SIDE OPTICAL COMMUNICATION DEVICE AND DATA TRANSFER METHOD

(71) Applicant: Nippon Telegraph and Telephone Corporation, Tokyo (JP)

(72) Inventors: Kenta Ito, Musashino (JP); Hiroaki Katsurai, Musashino (JP); Tomoaki Yoshida, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 198 days.

(21) Appl. No.: 18/035,646

(22) PCT Filed: Nov. 20, 2020

(86) PCT No.: PCT/JP2020/043499
§ 371 (c)(1),
(2) Date: May 5, 2023

(87) PCT Pub. No.: WO2022/107339
PCT Pub. Date: May 27, 2022

(65) Prior Publication Data
US 2023/0421269 A1    Dec. 28, 2023

(51) Int. Cl.
*H04B 10/80*    (2013.01)

(52) U.S. Cl.
CPC .................. *H04B 10/807* (2013.01)

(58) Field of Classification Search
None
See application file for complete search history.

(56) References Cited

U.S. PATENT DOCUMENTS

2005/0226625 A1* 10/2005 Wake ............... H04B 10/25753
398/115
2009/0016715 A1* 1/2009 Furey ................... H04B 10/807
398/38
2018/0083715 A1* 3/2018 Greene ............... H04B 10/807

FOREIGN PATENT DOCUMENTS

JP     2010011339 A  *  1/2010
JP     2017098643       6/2017

* cited by examiner

*Primary Examiner* — David W Lambert
(74) *Attorney, Agent, or Firm* — Fish & Richardson P.C.

(57) ABSTRACT

A power supply side optical communication apparatus supplies power to a power receiving side optical communication apparatus using an optical signal for power supply, a power storage unit stores the supplied power, a data control unit of the power supply side optical communication apparatus superimposes data transmission/reception control information on the optical signal for power supply, a control information detection unit detects the data transmission/ reception control information superimposed on the optical signal for power supply, a data transfer control unit calculates a data amount of data to be output to each of an optical transmission/reception unit and an external transmission/ reception unit, outputs data equal to or less than a transferable data amount to both or either of the optical transmission/reception unit and the external transmission/reception unit and the external transmission/reception unit, and stores the data exceeding the transferable data amount in the data storage unit.

15 Claims, 4 Drawing Sheets

OPTICAL POWER SUPPLY SYSTEM, POWER RECEIVING SIDE OPTICAL COMMUNICATION DEVICE AND DATA TRANSFER METHOD

CROSS-REFERENCE TO RELATED APPLICATIONS

This application is a National Stage application under 35 U.S.C. § 371 of International Application No. PCT/JP2020/043499, having an International Filing Date of Nov. 20, 2020. The disclosure of the prior application is considered part of the disclosure of this application, and is incorporated by reference in its entirety into this application.

TECHNICAL FIELD

The present invention relates to an optical power supply system, a power receiving side optical communication apparatus, and a data transfer method.

BACKGROUND ART

As an optical power supply system in the related art, a configuration illustrated in FIG. 4 has been proposed (see, for example, Patent Literature 1). FIG. 4 is a diagram for describing an optical power supply system in the related art. In FIG. 4, FIG. 2 of Patent Literature 1 is cited. The optical power supply system illustrated in FIG. 4 includes a master unit 120 and three slave units 127-1, 127-2, and 127-3. The master unit 120 and the slave units 127-1 to 127-3 are connected in a star shape via an optical fiber 125 and an optical splitter 126. The master unit 120 includes a power supply laser light source 121 that emits light having a wavelength $\lambda p$, a downlink communication optical transmitter 122 that emits light having a wavelength $\lambda d$, and an uplink communication optical receiver 123 that receives light having a wavelength $\lambda u$. The light having the wavelengths $\lambda p$, $\lambda d$, and $\lambda u$ is multiplexed and demultiplexed by a wavelength multiplexer/demultiplexer 124.

Each of the slave units 127-1 to 127-3 includes power supply optical receivers 129-1 to 129-3 that receive light having a wavelength $\lambda p$, downlink communication optical receivers 130-1 to 130-3 that receive light having a wavelength $\lambda d$, and uplink communication optical transmitters 131-1 to 131-3 that emit light having a wavelength $\lambda u$. The light having the wavelengths $\lambda p$, $\lambda d$, and $\lambda u$ is multiplexed and demultiplexed by wavelength multiplexer/demultiplexers 128-1 to 128-3.

A downlink communication signal 132 having a wavelength $\lambda d$ transmitted by the master unit 120 is configured by repetition of a time frame 134 having a constant time width. Each time frame includes slave unit identification information 133. An uplink communication signal 135 having a wavelength $\lambda u$ is a signal obtained by combining the communication signals of the light having the wavelength $\lambda u$ emitted from each of the uplink communication optical transmitters 131-1 to 131-3 by the optical splitter 126. The time width of the uplink communication signal 135 is a time width corresponding to the communication amount of each of the slave units 127-1 to 127-3.

In the optical power supply system of Patent Literature 1, since the power supply optical receivers 129-1 to 129-3 included in the slave units 127-1 to 127-3 receive the power supply light output from the power supply laser light source 121 included in the master unit 120, the slave units 127-1 to 127-3 can receive power supply from the master unit 120.

The downlink communication signal 132 having the wavelength $\lambda d$ transmitted by the master unit 120 is configured by repetition of the time frame 134 having a constant time width, and each time frame 134 is allocated to each of the slave units 127-1 to 127-3. Therefore, each of the slave units 127-1 to 127-3 is in the operating state only for the time of receiving the time frame 134 including the slave unit identification information 133 corresponding to the slave unit itself, and transitions to the non-operating state for the other times. Thereby, it is possible to make it unnecessary for the slave units 127-1 to 127-3 to wait for the downlink communication, and thus it is possible to reduce the power consumption in the slave units 127-1 to 127-3.

CITATION LIST

Patent Literature

Patent Literature 1: JP 2017-98643 A

SUMMARY OF INVENTION

Technical Problem

However, in the optical power supply system in Patent Literature 1, since the slave units 127-1 to 127-3 necessarily need to be activated at a constant cycle, that is, at intervals of time frames 134×N having a constant time width, power is consumed at a constant cycle regardless of the presence or absence of data transmitted and received (here, N is the number of slave units 127-1 to 127-3). Therefore, when the amount of power storage in the slave units 127-1 to 127-3 is less than the amount of power necessary for activation and data processing, there is a problem that each of the slave units 127-1 to 127-3 cannot process the downlink communication signal 132 received from the master unit 120 and the uplink communication signal 135 transmitted to the master unit 120 and may discard them due to power shortage.

In the optical power supply system in Patent Literature 1, only a maximum amount of data fixed at a constant cycle can be transmitted and received. Therefore, there are cases where it is difficult to cope with a burst signal or the like in which the size of data arbitrarily changes, and there is a problem that communication efficiency is not good.

In view of the above circumstances, an object of the present invention is to provide a technology capable of transferring data of an arbitrary size according to an amount of stored power while preventing data being transferred from being discarded due to a power shortage in an optical communication system that supplies power by light.

Solution to Problem

According to one aspect of the present invention, there is provided an optical power supply system including: a power supply side optical communication apparatus; and a power receiving side optical communication apparatus, in which the power supply side optical communication apparatus includes: an optical power supply unit configured to transmit an optical signal for power supply; a data transmission/reception unit configured to transmit and receive an optical signal of data; and a data control unit configured to superimpose data transmission/reception control information related to transmission/reception of data transmitted/received by the data transmission/reception unit on the optical signal for power supply, and the power receiving side optical communication apparatus includes: a power storage unit configured to store power obtained from the optical signal for power supply transmitted by the optical power supply unit; a control information detection unit configured to detect the data transmission/reception control information superimposed on the optical signal for power supply; an optical transmission/reception unit configured to transmit and receive the optical signal of the data to and from the data transmission/reception unit; an external transmission/reception unit configured to transmit and receive the data to and from an external apparatus; a data storage unit configured to store data that has not been transmitted to the power supply side optical communication apparatus or the external apparatus; and a data transfer control unit configured to transfer data received by the optical transmission/reception unit to the external transmission/reception unit and transfer data received by the external transmission/reception unit to the optical transmission/reception unit, the data transfer control unit being configured to calculate a data amount of data to be output to each of the optical transmission/reception unit and the external transmission/reception unit on the basis of the data transmission/reception control information detected by the control information detection unit and a data amount of the data stored in the data storage unit, output data equal to or less than a transferable data amount calculated on the basis of an amount of power stored in the power storage unit among the data of the calculated data amount to both or either of the optical transmission/reception unit and the external transmission/reception unit, and store the data exceeding the transferable data amount in the data storage unit.

According to one aspect of the present invention, there is provided a power receiving side optical communication apparatus that is connected to a power supply side optical communication apparatus including an optical power supply unit configured to transmit an optical signal for power supply, a data transmission/reception unit configured to transmit and receive an optical signal of data, and a data control unit configured to superimpose data transmission/reception control information related to transmission/reception of data transmitted/received by the data transmission/reception unit on the optical signal for power supply, the power receiving side optical communication apparatus including: a power storage unit configured to store power obtained from the optical signal for power supply transmitted by the optical power supply unit; a control information detection unit configured to detect the data transmission/reception control information superimposed on the optical signal for power supply; an optical transmission/reception unit configured to transmit and receive the optical signal of the data to and from the data transmission/reception unit; an external transmission/reception unit configured to transmit and receive the data to and from an external apparatus; a data storage unit configured to store data that has not been transmitted to the power supply side optical communication apparatus or the external apparatus; and a data transfer control unit configured to transfer data received by the optical transmission/reception unit to the external transmission/reception unit and transfer data received by the external transmission/reception unit to the optical transmission/reception unit, the data transfer control unit being configured to calculate a data amount of data to be output to each of the optical transmission/reception unit and the external transmission/reception unit on the basis of the data transmission/reception control information detected by the control information detection unit and a data amount of the data stored in the data storage unit, output data equal to or less than a transferable data amount calculated on the basis of an amount of power stored in the power storage unit among the data of the calculated data amount to both or either of the optical transmission/reception unit and the external transmission/reception unit, and store the data exceeding the transferable data amount in the data storage unit.

According to one aspect of the present invention, there is provided a data transfer method performed in an optical power supply system including a power supply side optical communication apparatus and a power receiving side optical communication apparatus, the data transfer method including: supplying, by the power supply side optical communication apparatus, power to the power receiving side optical communication apparatus using an optical signal for power supply; storing, by a power storage unit of the power receiving side optical communication apparatus, the supplied power; transmitting and receiving, by a data transmission/reception unit of the power supply side optical communication apparatus and an optical transmission/reception unit of the power receiving side optical communication apparatus, optical signals of data; transmitting and receiving, by an external transmission/reception unit of the power receiving side optical communication apparatus and an external apparatus, the data; recording, in a data storage unit of the power receiving side optical communication apparatus, data that has not been transmitted to the power supply side optical communication apparatus or the external apparatus; superimposing, by a data control unit of the power supply side optical communication apparatus, data transmission/reception control information related to transmission/reception of data transmitted/received by the data transmission/reception unit on the optical signal for power supply; detecting, by a control information detection unit of the power receiving side optical communication apparatus, the data transmission/reception control information superimposed on the optical signal for power supply; and calculating, by a data transfer control unit that transfers data received by the optical transmission/reception unit to the external transmission/reception unit in the power receiving side optical communication apparatus and transfers data received by the external transmission/reception unit to the optical transmission/reception unit, a data amount of data to be output to each of the optical transmission/reception unit and the external transmission/reception unit on the basis of the data transmission/reception control information detected by the control information detection unit and a data amount of the data stored in the data storage unit, outputting data equal to or less than a transferable data amount calculated on the basis of an amount of power stored in the power storage unit among the data of the calculated data amount to both or either of the optical transmission/reception unit and the external transmission/reception unit, and storing the data exceeding the transferable data amount in the data storage unit.

Advantageous Effects of Invention

According to the present invention, it is possible to transfer data of an arbitrary size according to an amount of stored power while preventing data being transferred from being discarded due to a power shortage in an optical communication system that supplies power by light.

DESCRIPTION OF EMBODIMENTS

Figure 1:
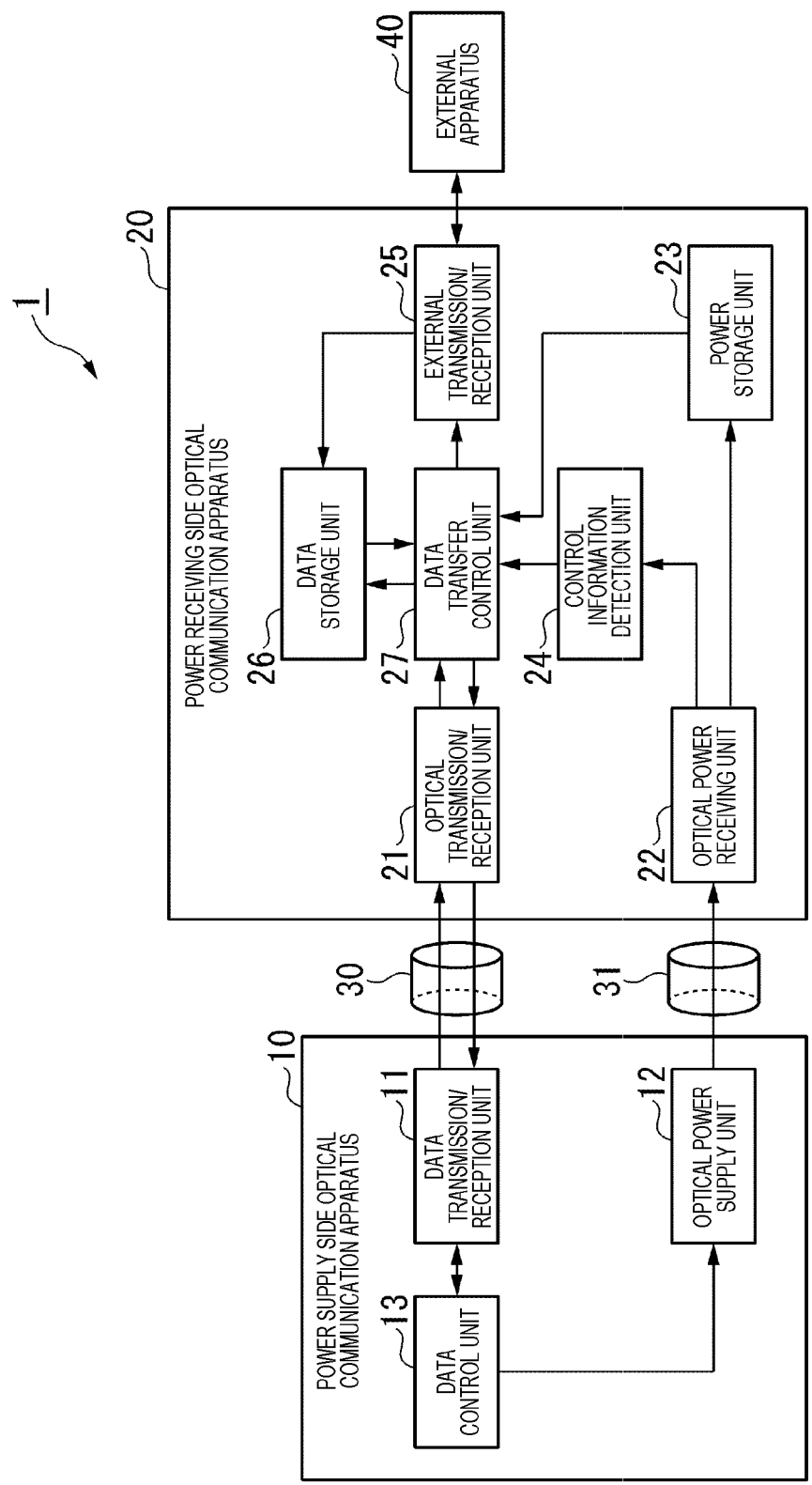
FIG. 1 is a block diagram illustrating a configuration of an optical power supply system according to an embodiment of the present invention.

Hereinafter, embodiments of the present invention will be described with reference to the drawings. FIG. 1 is a block diagram illustrating a configuration of an optical power supply system 1 according to an embodiment of the present invention. The optical power supply system 1 includes a power supply side optical communication apparatus 10, a power receiving side optical communication apparatus 20, an external apparatus 40, and two optical fibers 30 and 31 that connect the power supply side optical communication apparatus 10 and the power receiving side optical communication apparatus 20 to each other.

The power supply side optical communication apparatus 10 is, for example, an optical line terminal (OLT). The power supply side optical communication apparatus 10 includes a data transmission/reception unit 11, an optical power supply unit 12, and a data control unit 13. The data transmission/reception unit 11 is, for example, an optical transceiver, and includes a light source that emits light for data transmission inside. The data transmission/reception unit 11 modulates light emitted from a light source provided inside on the basis of an electrical signal of data given from the data control unit 13 to convert the light into an optical signal of data, and sends the converted optical signal of data to the optical fiber 30. The data transmission/reception unit 11 includes, for example, an optical/electrical (O/E) converter such as a photodetector inside. The data transmission/reception unit 11 receives an optical signal of data received through the optical fiber 30, converts the received optical signal of the data into an electrical signal by the O/E converter, and outputs the converted electrical signal to the data control unit 13.

The data control unit 13 takes in data to be transmitted to the power receiving side optical communication apparatus 20 from the outside. The data control unit 13 generates data of the electrical signal from the taken data, and outputs the generated data of the electrical signal to the data transmission/reception unit 11 according to an arbitrarily determined transmission timing. The data control unit 13 takes in data of the electrical signal output from the data transmission/reception unit 11 according to an arbitrarily determined reception timing, and outputs the taken data to the outside. The data control unit 13 generates data transmission/reception control information including a scheduled transmission data amount indicating the amount of data scheduled to be transmitted, a receivable data amount indicating the amount of data that can be received, and transmission/reception timing information indicating a timing of transmission/reception of data at an arbitrarily determined timing, and outputs the generated data transmission/reception control information to the optical power supply unit 12.

Here, the scheduled transmission data amount and the receivable data amount are "0" or positive numerical values. When the scheduled transmission data amount is "0", it means that there is no data to be transmitted by the power supply side optical communication apparatus 10, and when the scheduled transmission data amount is a value other than "0", it means that the power supply side optical communication apparatus 10 is scheduled to transmit data of the data amount of the value. When the receivable data amount is "0", it means that the power supply side optical communication apparatus 10 does not receive data, and when the receivable data amount is a value other than "0", it means that the power supply side optical communication apparatus 10 can receive data of the data amount of the value.

The optical power supply unit 12 includes a light source that emits light for power supply inside, and generates an optical signal for power supply by the light source and sends the optical signal to the optical fiber 31. After taking in the data transmission/reception control information output from the data control unit 13, the optical power supply unit 12 superimposes the data transmission/reception control information on an optical signal for power supply and sends the superimposed optical signal to the optical fiber 31.

The external apparatus 40 is, for example, a sensor node such as an Internet of Things (IoT) sensor. The external apparatus 40 is connected to the power receiving side optical communication apparatus 20 by wireless or wired communication means. For example, the external apparatus 40 transmits data measured by a sensor provided inside to the power receiving side optical communication apparatus 20 at a predetermined constant cycle. The external apparatus 40 receives data transmitted by the power receiving side optical communication apparatus 20. Note that there may be a plurality of external apparatuses 40, and in this case, the plurality of external apparatuses 40 are connected to the power receiving side optical communication apparatus 20 by wireless or wired communication means.

The power receiving side optical communication apparatus 20 is, for example, an optical network unit (ONU). The power receiving side optical communication apparatus 20 includes an optical transmission/reception unit 21, an optical power receiving unit 22, a power storage unit 23, a control information detection unit 24, an external transmission/reception unit 25, a data storage unit 26, and a data transfer control unit 27.

The optical transmission/reception unit 21 is, for example, an optical transceiver, and includes a light source that emits light for data transmission inside. The optical transmission/reception unit 21 modulates light emitted from a light source provided inside on the basis of an electrical signal of data output from the data transfer control unit 27 to convert the light into an optical signal of data, and sends the converted optical signal of the data to the optical fiber 30. The optical transmission/reception unit 21 includes, for example, an O/E converter such as a photodetector inside, receives an optical signal of data received through the optical fiber 30, converts the received optical signal of the data into an electrical signal by the O/E converter, and outputs the converted electrical signal to the data transfer control unit 27.

The optical power receiving unit 22 is, for example, an O/E converter, receives an optical signal for power supply received through the optical fiber 31, and converts the received optical signal for power supply into an electrical signal. The optical power receiving unit 22 outputs the converted electrical signal to the power storage unit 23.

The power storage unit 23 is, for example, a battery, performs charging processing on the basis of the electrical signal output from the optical power receiving unit 22, and stores power of the electrical signal. The power storage unit 23 supplies power necessary for operation to the optical transmission/reception unit 21, the optical power receiving unit 22, the control information detection unit 24, the external transmission/reception unit 25, the data storage unit 26, and the data transfer control unit 27. The control information detection unit 24 detects data transmission/reception control information superimposed on the electrical signal for power supply converted by the optical power receiving unit 22.

The external transmission/reception unit 25 is connected to the external apparatus 40 by wireless or wired communication means. When the external transmission/reception unit 25 is connected to the external apparatus 40 by wireless communication means, for example, a Wi-Fi module (Wi-Fi is a registered trademark) or the like is applied as the external transmission/reception unit 25. The external transmission/reception unit 25 receives data transmitted by the external apparatus 40 at a predetermined constant cycle, and writes and stores the received data in the data storage unit 26. The external transmission/reception unit 25 takes in data output from the data transfer control unit 27, and transmits the taken data to the external apparatus 40.

The data storage unit 26 stores the data received by the external transmission/reception unit 25 from the external apparatus 40 as uplink data. The data storage unit 26 stores, as downlink data, data that the data transfer control unit 27 has not output to the external transmission/reception unit 25. Here, the uplink data is data that the power receiving side optical communication apparatus 20 receives from the external apparatus 40 and transmits to the power supply side optical communication apparatus 10, and the downlink data is data that the power receiving side optical communication apparatus 20 receives from the power supply side optical communication apparatus 10 and transmits to the external apparatus 40. Note that the uplink data includes data that the power receiving side optical communication apparatus 20 receives from the external apparatus 40 and does not transmit to the power supply side optical communication apparatus 10, and the downlink data includes data that the power receiving side optical communication apparatus 20 receives from the power supply side optical communication apparatus 10 and does not transmit to the external apparatus 40. These pieces of data that are not transmitted are used for control processing in the power receiving side optical communication apparatus 20 and the like, and are erased from the data storage unit 26.

The data transfer control unit 27 takes in data output from the optical transmission/reception unit 21 and outputs the taken data to the external transmission/reception unit 25, thereby transferring data between the optical transmission/reception unit 21 and the external transmission/reception unit 25. The data transfer control unit 27 reads the uplink data stored in the data storage unit 26 and outputs the read data to the optical transmission/reception unit 21, thereby transferring data between the external transmission/reception unit 25 and the optical transmission/reception unit 21. The data transfer control unit 27 reads the downlink data stored in the data storage unit 26 and outputs the read data to the external transmission/reception unit 25, thereby transferring data between the optical transmission/reception unit 21 and the external transmission/reception unit 25.

Note that, in the data transfer control unit 27, a state in which, for example, connection cannot be established due to an unsatisfactory wireless environment, and the external transmission/reception unit 25 cannot transmit data to the external apparatus 40 in the case of a configuration in which the external transmission/reception unit 25 and the external apparatus 40 are wirelessly connected, a state in which, for example, in order to reduce the processing load of the external apparatus 40, processing for transmitting data by the external apparatus 40 is prioritized over processing for receiving data by the external apparatus 40, and processing in which the external transmission/reception unit 25 transmits data to the external apparatus 40 is suspended while the external transmission/reception unit 25 receives data from the external apparatus 40, or a state in which data cannot be output to the external transmission/reception unit 25 due to a power shortage of the power storage unit 23 is also assumed. In such a state, the data transfer control unit 27 does not output data to the external transmission/reception unit 25, and writes and stores the data in the data storage unit 26 as downlink data.

In the detection of the state in which the external transmission/reception unit 25 cannot transmit data to the external apparatus 40, for example, the external transmission/reception unit 25 has a flag indicating a connection state with the external apparatus 40 in an internal storage area, and the flag is set to "1" when the data can be transmitted to the external apparatus 40, and the flag is set to "0" when the data cannot be transmitted to the external apparatus 40. Before outputting data to the external transmission/reception unit 25, the data transfer control unit 27 refers to the flag and determines whether to output the data to the external transmission/reception unit 25 or to write and store the data in the data storage unit 26 without outputting the data to the external transmission/reception unit 25.

The data transfer control unit 27 calculates the maximum amount of data that can be transferred by the optical transmission/reception unit 21 and the external transmission/reception unit 25 (hereinafter referred to as a "transferable data amount") on the basis of the amount of power stored in the power storage unit 23.

The data transfer control unit 27 calculates the data amount of data to be output to each of the optical transmission/reception unit 21 and the external transmission/reception unit 25 on the basis of the scheduled transmission data amount and the receivable data amount included in the data transmission/reception control information, and the size of the uplink data (hereinafter referred to as an "uplink data amount") and the size of the downlink data (hereinafter referred to as a "downlink data amount") stored in the data storage unit 26. The data transfer control unit 27 outputs data equal to or less than the calculated transferable data amount among the data of the calculated data amount to both or either of the optical transmission/reception unit 21 and the external transmission/reception unit 25. When outputting data to the optical transmission/reception unit 21, the data transfer control unit 27 outputs the uplink data read from the data storage unit 26 to the optical transmission/reception unit 21 according to the reception timing when the power supply side optical communication apparatus 10 can receive data indicated by the read transmission/reception timing information.

The data transfer control unit 27 causes the data storage unit 26 to store data exceeding the calculated transferable data amount. In other words, when the amount of the data exceeds the transferable data amount in a case where data output from the optical transmission/reception unit 21 is taken and the taken data is output to the external transmission/reception unit 25, the data transfer control unit 27 writes and stores the taken data in the data storage unit 26 as downlink data. When the amount of data exceeds the transferable data amount in a case where the uplink data stored in the data storage unit 26 is output to the optical transmission/reception unit 21, the data transfer control unit 27 does not read the uplink data from the data storage unit 26 but stores the data in the data storage unit 26.

In the optical power supply system 1, one optical fiber 30 transmits a downlink optical signal transmitted by the power supply side optical communication apparatus 10 and received by the power receiving side optical communication apparatus 20 and an uplink optical signal transmitted by the power receiving side optical communication apparatus 20 and received by the power supply side optical communication apparatus 10. Therefore, in the optical fiber 30, the light source included in the data transmission/reception unit 11 and the light source included in the optical transmission/reception unit 21 emit light having different wavelengths so that the downlink optical signal and the uplink optical signal do not interfere with each other, and the data transmission/reception unit 11 and the optical transmission/reception unit 21 internally include an optical multiplexer/demultiplexer that multiplexes and demultiplexes these different wavelengths.

(Data Transfer Processing in Optical Power Supply System)

Figure 2:
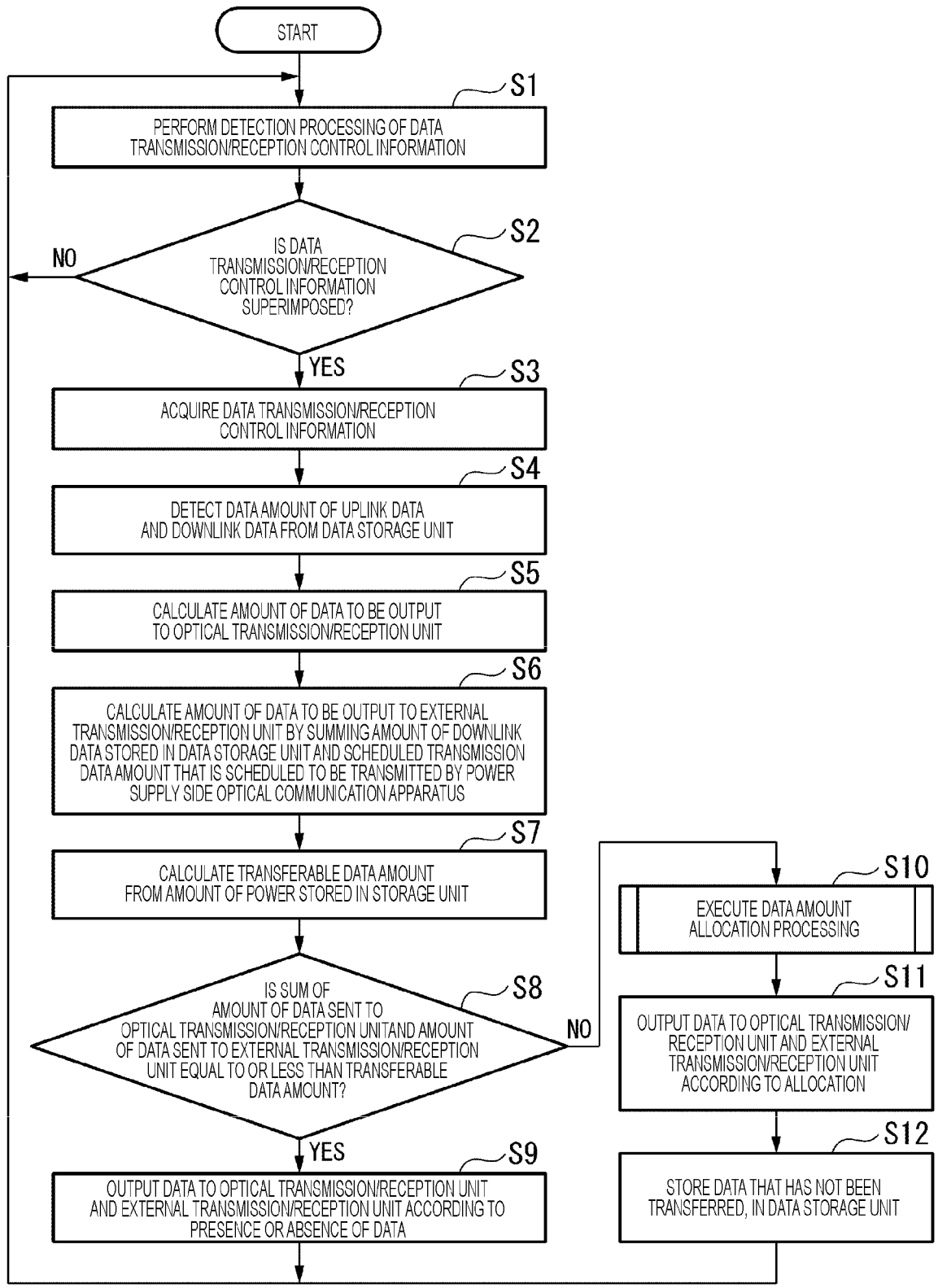
FIG. 2 is a flowchart illustrating a flow of processing by a power receiving side optical communication apparatus according to the embodiment of the present invention.

FIG. 2 is a flowchart illustrating the operation of the power receiving side optical communication apparatus 20, and data transfer processing in the optical power supply system 1 will be described with reference to the flowchart.

In parallel with the processing of the flowchart of FIG. 2, in the optical power supply system 1, the following processing is repeatedly and continuously performed. The optical power supply unit 12 of the power supply side optical communication apparatus 10 generates an optical signal for power supply, and transmits the generated optical signal for power supply to the power receiving side optical communication apparatus 20 through the optical fiber 31. The data control unit 13 generates data transmission/reception control information at an arbitrarily determined timing, and outputs the generated data transmission/reception control information to the optical power supply unit 12. Upon receiving the data transmission/reception control information from the data control unit 13, the optical power supply unit 12 superimposes the received data transmission/reception control information on an optical signal for power supply and transmits the superimposed optical signal.

Upon receiving the optical signal for power supply through the optical fiber 31, the optical power receiving unit 22 of the power receiving side optical communication apparatus 20 converts the received optical signal for power supply into an electrical signal and outputs the converted electrical signal to the power storage unit 23. The power storage unit 23 performs charging processing on the basis of the electrical signal output from the optical power receiving unit 22, and stores power of the electrical signal.

The external apparatus 40 transmits data measured by a sensor provided inside to the power receiving side optical communication apparatus 20 at a predetermined constant cycle. When receiving data transmitted by the external apparatus 40, the external transmission/reception unit 25 of the power receiving side optical communication apparatus 20 writes and stores the received data in the data storage unit 26 as uplink data.

Hereinafter, the flow of processing will be described with reference to the flowchart of FIG. 2. The control information detection unit 24 of the power receiving side optical communication apparatus 20 performs detection processing of the data transmission/reception control information on the electrical signal output from the optical power receiving unit 22 (step S1), and determines whether or not the data transmission/reception control information is superimposed on the electrical signal (step S2). When the control information detection unit 24 determines that the data transmission/reception control information is not superimposed on the electrical signal output from the optical power receiving unit 22 (step S2, No), the control information detection unit 24 performs the processing of step S1 again.

On the other hand, when the control information detection unit 24 determines that the data transmission/reception control information is superimposed on the electrical signal output from the optical power receiving unit 22 (step S2, Yes), the control information detection unit 24 reads the data transmission/reception control information superimposed on the electrical signal, and outputs the read data transmission/reception control information to the data transfer control unit 27.

When taking in the data transmission/reception control information output from the control information detection unit 24, the data transfer control unit 27 reads a scheduled transmission data amount, a receivable data amount, and transmission/reception timing information included in the taken data transmission/reception control information (step S3). The data transfer control unit 27 detects the amount of uplink data and the amount of downlink data stored in the data storage unit 26 (step S4).

The data transfer control unit 27 calculates the amount of data to be output to the optical transmission/reception unit 21 on the basis of the detected uplink data amount and the receivable data amount (step S5). Specifically, when the detected uplink data amount is equal to or less than the receivable data amount, the data transfer control unit 27 sets all of the detected uplink data amount as the amount of data to be output to the optical transmission/reception unit 21. When the detected uplink data amount exceeds the receivable data amount, the data transfer control unit 27 sets the receivable data amount as the amount of data to be output to the optical transmission/reception unit 21.

The data transfer control unit 27 calculates the amount of data to be output to the external transmission/reception unit 25 by summing the detected downlink data amount and the scheduled transmission data amount (step S6). The data transfer control unit 27 detects the amount of power stored in the power storage unit 23. The data transfer control unit 27 calculates the transferable data amount from the detected amount of power (step S7).

The data transfer control unit 27 adds the amount of data to be output to the optical transmission/reception unit 21 and the amount of data to be output to the external transmission/reception unit 25, and determines whether or not the added total data amount is equal to or less than the transferable data amount (step S8).

When it is determined that the total data amount is equal to or less than the transferable data amount (step S8, Yes), the data transfer control unit 27 transfers the data as follows.

When the data storage unit 26 stores the downlink data, the data transfer control unit 27 reads the downlink data from the data storage unit 26 and outputs the read data to the external transmission/reception unit 25. The external transmission/reception unit 25 takes in data output from the data transfer control unit 27, and transmits the taken data to the external apparatus 40. When the external transmission/reception unit 25 cannot transmit data to the external apparatus 40, the data transfer control unit 27 does not read downlink data from the data storage unit 26 and leaves the data as it is.

When the data storage unit 26 stores the uplink data, the data transfer control unit 27 reads the uplink data from the data storage unit 26 and outputs the read data to the optical transmission/reception unit 21 at a receivable timing of the power supply side optical communication apparatus 10 indicated by the transmission/reception timing information.

When the amount of uplink data stored in the data storage unit 26 exceeds the receivable data amount, the uplink data is read from the data storage unit 26 by the amount of data corresponding to the receivable data amount, and the read data is output to the optical transmission/reception unit 21. The optical transmission/reception unit 21 takes in data output from the data transfer control unit 27, and transmits the taken data to the data transmission/reception unit 11 through the optical fiber 30.

In a case where the scheduled transmission data amount is a value other than "0", that is, there is scheduled transmission data, the optical transmission/reception unit 21 receives an optical signal of data from the data transmission/reception unit 11 through the optical fiber 30 at the scheduled transmission timing of the power supply side optical communication apparatus 10 indicated by the transmission/reception timing information. The optical transmission/reception unit 21 converts the received optical signal of the data into an electrical signal and outputs the electrical signal to the data transfer control unit 27. The data transfer control unit 27 takes in data output from the optical transmission/reception unit 21 and outputs the taken data to the external transmission/reception unit 25. The external transmission/reception unit 25 takes in data output from the data transfer control unit 27, and transmits the taken data to the external apparatus 40. When the external transmission/reception unit 25 cannot transmit data to the external apparatus 40 and the data output from the optical transmission/reception unit 21 is taken, the data transfer control unit 27 does not output the data to the external transmission/reception unit 25 but writes and stores the data in the data storage unit 26 as downlink data (step S9).

Figure 3:
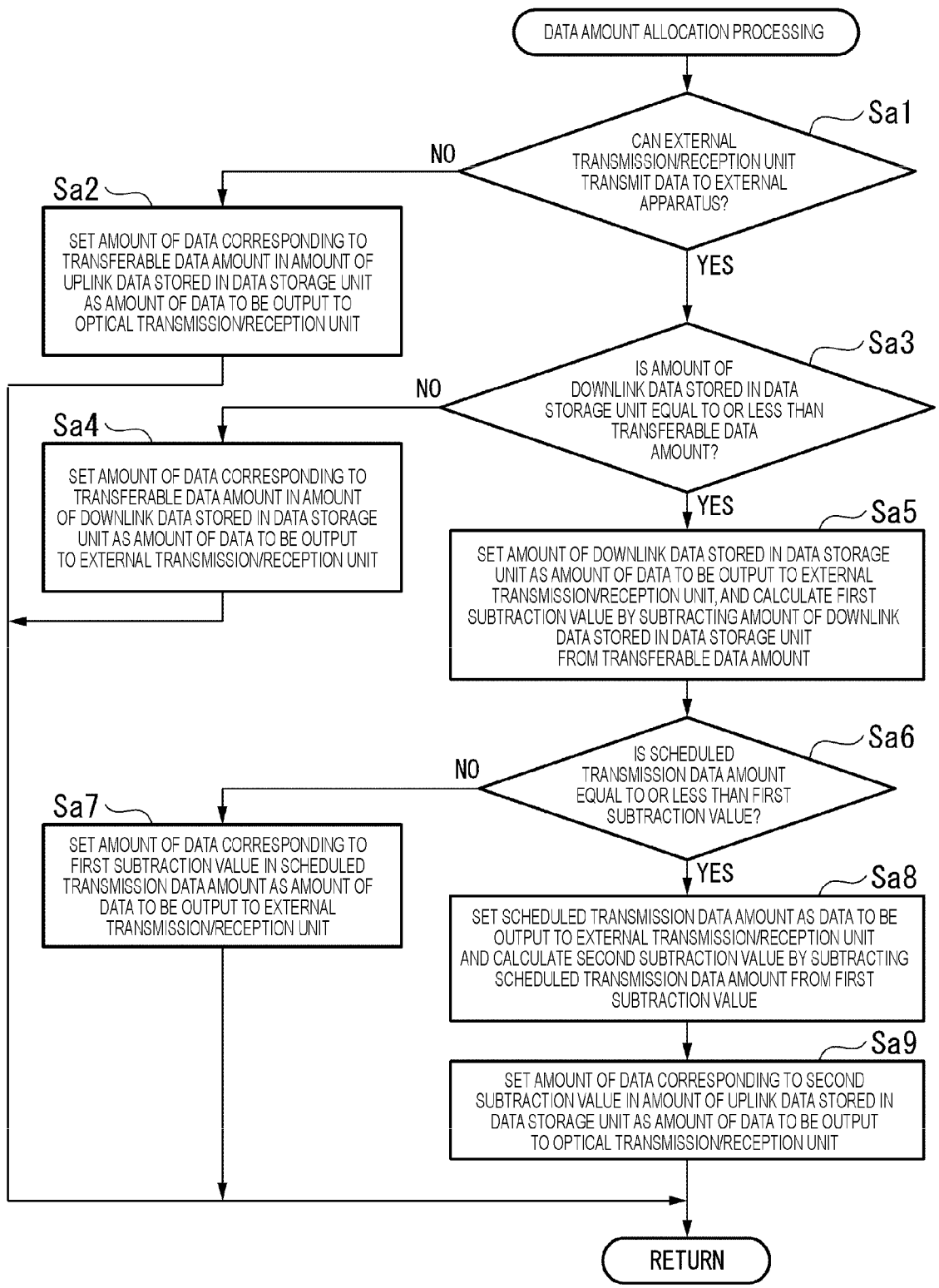
FIG. 3 is a flowchart illustrating a flow of processing of a subroutine of data amount allocation processing by the power receiving side optical communication apparatus according to the embodiment of the present invention.
Figure 4:
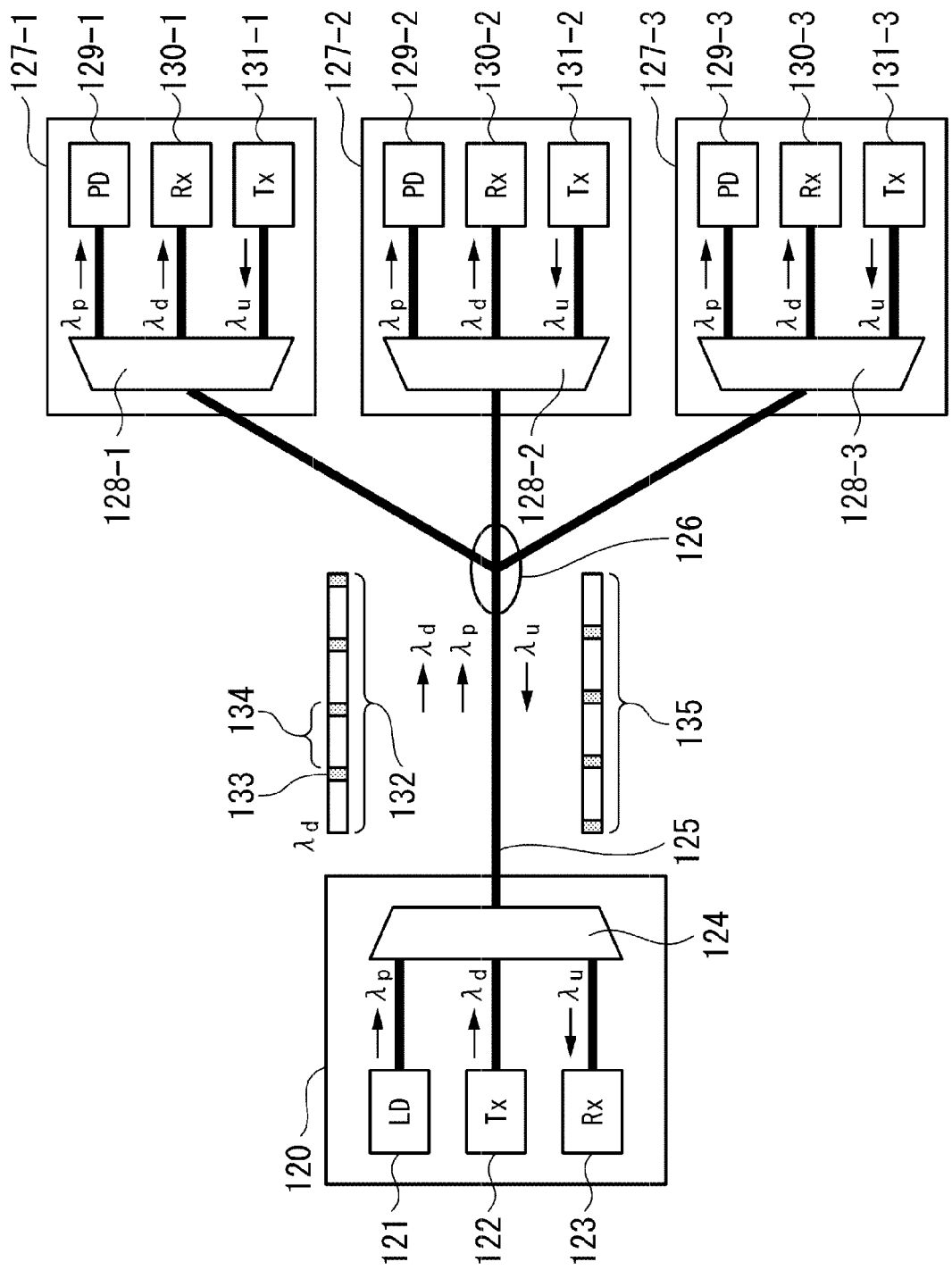
FIG. 4 is a diagram for describing an optical power supply system in the related art.

On the other hand, when the data transfer control unit 27 determines that the total data amount is not equal to or less than the transferable data amount (step S8, No), the data transfer control unit executes a subroutine of the data amount allocation processing of allocating the data amount within the range of the transferable data amount illustrated in FIG. 3 (step S10).

The data transfer control unit 27 refers to the flag in the internal storage area of the external transmission/reception unit 25 and determines whether or not the external transmission/reception unit 25 can transmit data to the external apparatus 40 (step Sa1). When the data transfer control unit 27 determines that the external transmission/reception unit 25 cannot transmit data to the external apparatus 40 (step Sa1, No), the data transfer control unit sets the amount of data corresponding to the transferable data amount in the uplink data amount stored in the data storage unit 26 as the amount of data to be output to the optical transmission/reception unit 21 (step Sa2), and ends the subroutine.

When the data transfer control unit 27 determines that the external transmission/reception unit 25 can transmit data to the external apparatus 40 (step Sa1, Yes), the data transfer control unit determines whether or not the amount of downlink data stored in the data storage unit 26 is equal to or less than the transferable data amount (step Sa3). When the data transfer control unit 27 determines that the amount of downlink data stored in the data storage unit 26 is not equal to or less than the transferable data amount (step Sa3, No), the data transfer control unit sets the amount of data corresponding to the transferable data amount in the downlink data stored in the data storage unit 26 as data to be output to the external transmission/reception unit 25 (step Sa4), and ends the subroutine. In this case, the data transfer control unit 27 writes and stores the data output from the optical transmission/reception unit 21 in the data storage unit 26 as downlink data without outputting the data to the external transmission/reception unit 25, and further, the uplink data stored in the data storage unit 26 is kept stored in the data storage unit 26.

When the data transfer control unit 27 determines that the amount of downlink data stored in the data storage unit 26 is equal to or less than the transferable data amount (step Sa3, Yes), the data transfer control unit sets the downlink data stored in the data storage unit 26 as data to be output to the external transmission/reception unit 25, and calculates a first subtraction value by subtracting the amount of downlink data stored in the data storage unit 26 from the transferable data amount (step Sa5).

The data transfer control unit 27 determines whether or not the scheduled transmission data amount is equal to or less than the calculated first subtraction value (step Sa6). In a case where the data transfer control unit 27 determines that the scheduled transmission data amount is not equal to or less than the calculated first subtraction value (step Sa6, No), the data transfer control unit sets the amount of data corresponding to the first subtraction value in the scheduled transmission data amount as the amount of data to be output to the external transmission/reception unit 25 (step Sa7), and ends the subroutine. In this case, the data transfer control unit 27 writes and stores the data of the remaining data amount obtained by subtracting the first subtraction value from the scheduled transmission data amount in the data storage unit 26 as the downlink data, and the uplink data stored in the data storage unit 26 is kept stored in the data storage unit 26.

In a case where the data transfer control unit 27 determines that the scheduled transmission data amount is equal to or less than the calculated first subtraction value (step Sa6, Yes), the data transfer control unit sets the data amount of the data output from the optical transmission/reception unit 21, that is, the scheduled transmission data amount as the amount of data to be output to the external transmission/reception unit 25, and calculates a second subtraction value by subtracting the scheduled transmission data amount from the first subtraction value (step Sa8). The data transfer control unit 27 sets the amount of data corresponding to the second subtraction value in the uplink data stored in the data storage unit 26 as the amount of data to be output to the optical transmission/reception unit 21 (step Sa9), and ends the subroutine.

The data transfer control unit 27 performs data transfer processing as follows according to the allocation policy obtained in the subroutine of the data amount allocation processing in step S10. When the data storage unit 26 stores the downlink data, the data transfer control unit 27 reads the downlink data from the data storage unit 26 within the range of the data amount allocated by the allocation policy, and outputs the read data to the external transmission/reception unit 25. The external transmission/reception unit 25 takes in data output from the data transfer control unit 27, and transmits the taken data to the external apparatus 40.

In a case where the scheduled transmission data amount is a value other than "0", that is, there is scheduled transmission data, the optical transmission/reception unit 21 receives an optical signal of data from the data transmission/reception unit 11 through the optical fiber 30 at the scheduled transmission timing of the power supply side optical communication apparatus 10 indicated by the transmission/reception timing information. The optical transmission/reception unit 21 converts the received optical signal of the data into an electrical signal and outputs the electrical signal to the data transfer control unit 27. The data transfer control unit 27 takes in data output from the optical transmission/ reception unit 21, and outputs data corresponding to the data amount allocated by the allocation policy among the taken data to the external transmission/reception unit 25. The external transmission/reception unit 25 takes in data output from the data transfer control unit 27, and transmits the taken data to the external apparatus 40.

When the data storage unit 26 stores the uplink data, the data transfer control unit 27 reads the uplink data from the data storage unit 26 within the range of the data amount allocated by the allocation policy and outputs the read data to the optical transmission/reception unit 21 at the receivable timing of the power supply side optical communication apparatus 10 indicated by the transmission/reception timing information. The optical transmission/reception unit 21 takes in data output from the data transfer control unit 27, and transmits the taken data to the data transmission/reception unit 11 through the optical fiber 30 (step S11).

Thereby, the power receiving side optical communication apparatus 20 can transfer data in the order of the downlink data stored in the data storage unit 26 as a first priority, the downlink data received by the optical transmission/reception unit 21 from the power supply side optical communication apparatus 10 as a second priority, and the uplink data stored in the data storage unit 26 as a third priority.

When there is data that is to be output from the optical transmission/reception unit 21 and has not been output to the external transmission/reception unit 25, the data transfer control unit 27 writes and stores the data in the data storage unit 26 as downlink data (step S12). Thereafter, the processing from step S1 is repeatedly performed.

In the configuration of the above embodiment, the power supply side optical communication apparatus 10 supplies power to the power receiving side optical communication apparatus 20 using an optical signal for power supply, and the power storage unit 23 stores the supplied power. The data transmission/reception unit 11 and the optical transmission/ reception unit 21 transmit and receive optical signals of data. The external transmission/reception unit 25 and the external apparatus 40 transmit and receive data. The data storage unit 26 stores data that has not been transmitted to the power supply side optical communication apparatus 10 or the external apparatus 40. The data control unit 13 generates data transmission/reception control information related to transmission/reception of data transmitted/received by the data transmission/reception unit 11, and superimposes the generated data transmission/reception control information on an optical signal for power supply. The control information detection unit 24 detects data transmission/reception control information superimposed on the optical signal for power supply. The data transfer control unit 27 that transfers the data received by the optical transmission/reception unit 21 to the external transmission/reception unit 25 and transfers the data received by the external transmission/reception unit 25 to the optical transmission/reception unit 21 calculates the data amount of the data to be output to each of the optical transmission/reception unit 21 and the external transmission/reception unit 25 on the basis of the data transmission/reception control information detected by the control information detection unit 24 and the data amount of the data stored in the data storage unit 26, outputs data equal to or less than the transferable data amount calculated on the basis of the amount of power stored in the power storage unit 23 among the data of the calculated data amount to both or either of the optical transmission/reception unit 21 and the external transmission/reception unit 25, and causes the data storage unit 26 to store data exceeding the transferable data amount.

Thereby, since the data transfer control unit 27 calculates the transferable data amount according to the power stored in the power storage unit 23 and transfers data according to the calculated transferable data amount, it is possible to prevent data being transferred from being discarded due to a power shortage. Since the data transfer control unit 27 can transfer data of a size corresponding to the amount of power stored in the power storage unit 23, data of an arbitrary size corresponding to the amount of power stored in the power storage unit 23 can be transferred.

Note that, although the example in which the downlink direction is prioritized in the data amount allocation processing in step S10 of FIG. 2 has been described, an arbitrary priority rule may be set such that the uplink direction is prioritized, or priority is given in advance to each of the uplink and downlink data stored in the data storage unit 26 and the data transmitted and received with the optical transmission/reception unit 21, and the corresponding data is prioritized according to the priority. Even in a case where the downlink direction is prioritized, as in the above example, instead of prioritizing the downlink data stored in the data storage unit 26 over the downlink data output from the optical transmission/reception unit 21, the downlink data output from the optical transmission/reception unit 21 may be prioritized. Note that, in a case where the uplink direction is prioritized, when the uplink data amount stored in the data storage unit 26 exceeds the receivable data amount, it is necessary to perform allocation while considering that only the receivable data amount can be allocated as the uplink data amount.

It is assumed that the external transmission/reception unit 25 receives data from the external apparatus 40 and writes the received data in the data storage unit 26 during a period from step S4 to step S9 or from step S4 to step S11 in FIG. 2, whereby the uplink data amount increases. In this case, in step S9 or step S11, in principle, the data transfer control unit 27 reads the data of the uplink data amount detected at the time of the processing of step S4 from the data storage unit 26, and outputs the read data to the optical transmission/ reception unit 21. However, as an exception, in a case where there is a margin in the transferable data amount, the uplink data corresponding to the increase may be read from the data storage unit 26, and the read data may be output to the optical transmission/reception unit 21.

In the processing of FIG. 2, the data transfer control unit 27 may perform the processing of step S7 between steps S3 and S4, between steps S4 and S5, or between steps S5 and S6. The data transfer control unit 27 may perform the processing by reversing the order of step S5 and step S6.

In above embodiment, the optical power supply system 1 may include the plurality of power receiving side optical communication apparatuses 20, and in this case, the power supply side optical communication apparatus 10 and each of the plurality of power receiving side optical communication apparatuses 20 are connected by a single star type communication network. Since the they are connected by the single star type communication network, the power supply side optical communication apparatus 10 includes the data transmission/reception units 11 and the optical power supply units 12 as many as the number of the plurality of power receiving side optical communication apparatuses 20. Each of the plurality of data transmission/reception units 11 is connected one-to-one to the optical transmission/reception unit 21 included in each of the plurality of power receiving side optical communication apparatuses 20 by each of the number of optical fibers 30 corresponding to the number of the plurality of power receiving side optical communication apparatuses 20. Each of the plurality of optical power supply units 12 is connected one-to-one to the optical power receiving unit 22 included in each of the plurality of power receiving side optical communication apparatuses 20 by each of the number of optical fibers 31 corresponding to the number of the plurality of power receiving side optical communication apparatuses 20. Note that, the power supply side optical communication apparatus 10 and each of the plurality of power receiving side optical communication apparatuses 20 are connected on a one-to-one basis in a case where the power supply side optical communication apparatus 10 and each of the plurality of power receiving side optical communication apparatuses 20 are connected by a single star type communication network. Therefore, the transmission/reception timing information does not have to be included in the data transmission/reception control information, and in the processing of steps S9 and S11, when the data storage unit 26 stores uplink data, the data transfer control unit 27 may read the uplink data from the data storage unit 26 at an arbitrary timing and output the read data to the optical transmission/reception unit 21. As described above, the reason for connection by the single star type communication network is to make the amount of received light received by the optical power receiving unit 22 of the power receiving side optical communication apparatus 20 sufficient. In the case of a passive star type in which one optical fiber is branched into a plurality of optical fibers, the amount of received light received by the optical power receiving unit 22 of the power receiving side optical communication apparatus 20 decreases. However, the passive star type may be applied as long as the amount of received light received by the optical power receiving unit 22 of the power receiving side optical communication apparatus 20 can be made sufficient even if the passive star type is applied.

In the above embodiment, instead of the optical fiber 30, two optical fibers for uplink and downlink may be provided. In this case, it is not necessary to provide an optical multiplexer/demultiplexer inside the data transmission/reception unit 11 and the optical transmission/reception unit 21, a transmission port of the data transmission/reception unit 11 and a reception port of the optical transmission/reception unit 21 are connected to a downlink optical fiber, and a reception port of the data transmission/reception unit 11 and a transmission port of the optical transmission/reception unit 21 are connected to an uplink optical fiber.

The optical fiber 31 may not be provided, but only the optical fiber 30 may be provided, and transmission and reception of optical signals by wavelength multiplexing may be performed with the wavelength of light emitted from the light source provided inside the data transmission/reception unit 11, the wavelength of light emitted from the light source provided inside the optical transmission/reception unit 21, and the wavelength of light emitted from the light source provided inside the optical power supply unit 12 as different wavelengths. In this case, the data transmission/reception unit 11 and the optical transmission/reception unit 21 do not include an optical multiplexer/demultiplexer inside, but it is necessary that the power supply side optical communication apparatus 10 includes an optical multiplexer/demultiplexer that is connected to the transmission port and the reception port of the data transmission/reception unit 11 and the transmission port of the optical power supply unit 12 on one side, is connected to the optical fiber 30 on the other side, and multiplexes and demultiplexes light of three different wavelengths, and the power receiving side optical communication apparatus 20 includes an optical multiplexer/demultiplexer that is connected to the transmission port and the reception port of the optical transmission/reception unit 21 and the reception port of the optical power receiving unit 22 on one side, is connected to the optical fiber 30 on the other side, and multiplexes and demultiplexes light of three different wavelengths.

Although FIG. 1 illustrates that the data storage unit 26 is included in the power receiving side optical communication apparatus 20, the optical power supply system 1 may include an external data storage device connected to the power receiving side optical communication apparatus 20 instead of the data storage unit 26. In the configurations of the above embodiment, the optical power supply system 1 may not include the external apparatus 40.

In addition, in the above embodiment, the data control unit 13 of the power supply side optical communication apparatus 10 performs processing for taking in data to be transmitted to the power receiving side optical communication apparatus 20 from the outside and outputting the data to the data transmission/reception unit 11, and processing for taking in data of an electrical signal output from the data transmission/reception unit 11 and outputting the data to the outside. On the other hand, the data control unit 13 does not perform the input/output processing of the data with the data transmission/reception unit 11, but the data transmission/reception unit 11 may perform processing for taking in data given from the outside and transmitting the data to the receiving side optical communication apparatus 20 and processing for outputting the data received from the power receiving side optical communication apparatus 20 to the outside, and the data control unit 13 may monitor the input/output processing of the data of the data transmission/reception unit 11 and detect the scheduled transmission data amount, the receivable data amount, and the transmission/reception timing information.

Furthermore, in the above embodiment, when generating the data transmission/reception control information, the data control unit 13 may further include external apparatus transmission/reception timing information indicating transmission/reception timing between the arbitrarily determined power receiving side optical communication apparatus 20 and the external apparatus 40. In a case where the external apparatus transmission/reception timing information is included in the data transmission/reception control information, when there is data to be output to the external transmission/reception unit 25 in the processing of steps S9 and S11, the data transfer control unit 27 outputs the data to the external transmission/reception unit 25 at the transmission timing to the external apparatus 40 indicated by the external apparatus transmission/reception timing information included in the data transmission/reception control information.

In the above embodiment, when the data transfer control unit 27 detects that the amount of data remaining in the data storage unit 26 exceeds the upper limit value of the storage capacity of the data storage unit 26 as a result of the data allocation processing illustrated in FIG. 3, the data transfer control unit may request the data transmission/reception unit 11 of the power supply side optical communication apparatus 10 not to transmit the data of the scheduled transmission data amount notified to the power receiving side optical communication apparatus 20 immediately before the timing at which the data transmission/reception unit 11 transmits the data, or may request the data transmission/reception unit to transmit only the amount of data not exceeding the upper limit value of the storage capacity of the data storage unit 26.

In the above embodiment, the power storage unit 23 supplies power necessary for operation to the optical transmission/reception unit 21, the optical power receiving unit 22, the control information detection unit 24, the external transmission/reception unit 25, the data storage unit 26, and the data transfer control unit 27. On the other hand, while the processing of steps S1 and S2 in FIG. 2 is repeated, the power storage unit 23 supplies power necessary for operation to the optical power receiving unit 22 and the control information detection unit 24, but may not supply power to the other optical transmission/reception unit 21, the external transmission/reception unit 25, the data storage unit 26, and the data transfer control unit 27. In this case, when the control information detection unit 24 detects the data transmission/reception control information, that is, when the control information detection unit 24 determines "Yes" in step S2, the power storage unit 23 supplies power necessary for operation to the optical transmission/reception unit 21, the external transmission/reception unit 25, the data storage unit 26, and the data transfer control unit 27, and the power storage unit 23 stops the supply of power to the optical transmission/reception unit 21, the external transmission/reception unit 25, the data storage unit 26, and the data transfer control unit 27 at the timing when the processing in step S1 is started again.

The control information detection unit 24, the data transfer control unit 27, and the data storage unit 26 of the power receiving side optical communication apparatus 20 in the above-described embodiments may be realized by a computer. In that case, the program for achieving these functions may be recorded in a computer-readable recording medium, and the program recorded in the recording medium may be read and executed by a computer system to achieve the functions. Note that the "computer system" mentioned herein includes hardware such as an OS and peripheral devices. Also, the "computer-readable recording medium" refers to a portable medium such as a flexible disk, a magneto-optical disc, a read-only memory (ROM), or a compact disc read-only memory (CD-ROM), or a storage device such as a hard disk built in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for achieving some of the functions described above, may be formed with a combination of the functions described above and a program already recorded in a computer system, or may be formed with a programmable logic device such as a field programmable gate array (FPGA).

Although the embodiments of the present invention have been described in detail with reference to the drawings so far, specific configurations are not limited to these embodiments, and include designs and the like without departing from the spirit of the present invention.

INDUSTRIAL APPLICABILITY

The present invention can be applied to an optical communication system that performs optical power supply.

REFERENCE SIGNS LIST

1 Optical power supply system
10 Power supply side optical communication apparatus
11 Data transmission/reception unit
12 Optical power supply unit
13 Data control unit
20 Power receiving side optical communication apparatus
21 Optical transmission/reception unit
22 Optical power receiving unit
23 Power storage unit
24 Control information detection unit
25 External transmission/reception unit
26 Data storage unit
27 Data transfer control unit
30,31 Optical fiber
40 External apparatus

The invention claimed is:

1. An optical power supply system comprising:
a power supply side optical communication apparatus; and
a power receiving side optical communication apparatus,
wherein the power supply side optical communication apparatus includes:
an optical power supply unit, including one or more processors, configured to transmit an optical signal for power supply;
a data transmission/reception unit, including one or more processors, configured to transmit and receive an optical signal of data; and
a data control unit, including one or more processors, configured to superimpose data transmission/reception control information related to transmission/reception of data transmitted/received by the data transmission/reception unit on the optical signal for power supply, and
the power receiving side optical communication apparatus includes:
a power storage medium configured to store power obtained from the optical signal for power supply transmitted by the optical power supply unit;
a control information detection unit, including one or more processors, configured to detect the data transmission/reception control information superimposed on the optical signal for power supply;
an optical transmission/reception unit, including one or more processors, configured to transmit and receive the optical signal of the data to and from the data transmission/reception unit;
an external transmission/reception unit, including one or more processors, configured to transmit and receive the data to and from an external apparatus;
a data storage medium configured to store data that has not been transmitted to the power supply side optical communication apparatus or the external apparatus; and
a data transfer control unit, including one or more processors, configured to transfer data received by the optical transmission/reception unit to the external transmission/reception unit and transfer data received by the external transmission/reception unit to the optical transmission/reception unit, the data transfer control unit being configured to calculate a data amount of data to be output to each of the optical transmission/reception unit and the external transmission/reception unit on the basis of the data transmission/reception control information detected by the control information detection unit and a data amount of the data stored in the data storage medium, output data equal to or less than a transferable data amount calculated on the basis of an amount of power stored in the power storage medium among the data of the calculated data amount to both or either of the optical transmission/reception unit and the external transmission/reception unit, and store the data exceeding the transferable data amount in the data storage medium.

2. The optical power supply system according to claim 1,
wherein the data transmission/reception control information includes a scheduled transmission data amount and a receivable data amount, the scheduled transmission data amount indicating a data amount of data scheduled to be transmitted by the power supply side optical communication apparatus to the power receiving side optical communication apparatus, the receivable data amount indicating a data amount of data that is able to be received by the power supply side optical communication apparatus from the power receiving side optical communication apparatus, and the data transfer control unit is configured to calculate a data amount of data to be output to the optical transmission/reception unit on the basis of a data amount of uplink data transmitted from the power receiving side optical communication apparatus to the power supply side optical communication apparatus stored in the data storage medium and the receivable data amount, and calculate a data amount of data to be output to the external transmission/reception unit on the basis of a data amount of downlink data transmitted from the power receiving side optical communication apparatus to the external apparatus stored in the data storage medium and the scheduled transmission data amount.

3. The optical power supply system according to claim 1,
wherein the data transmission/reception control information includes transmission/reception timing information indicating a timing at which the power supply side optical communication apparatus transmits and receives data, and the data transfer control unit is configured to read data from the data storage medium and output the read data to the optical transmission/reception unit at a receivable timing of the power supply side optical communication apparatus indicated by the transmission/reception timing information.

4. The optical power supply system according to claim 1,
wherein, when the calculated data amount of the data to be output to each of the optical transmission/reception unit and the external transmission/reception unit exceeds the transferable data amount, the data transfer control unit is configured to allocate the data amount of the data to be output to both or either of the optical transmission/reception unit and the external transmission/reception unit within a range of the transferable data amount.

5. The optical power supply system according to claim 1, further comprising
a data storage device that is provided outside the power receiving side optical communication apparatus and is connected to the power receiving side optical communication apparatus, instead of the data storage medium.

6. A power receiving side optical communication apparatus that is connected to a power supply side optical communication apparatus including an optical power supply unit configured to transmit an optical signal for power supply, a data transmission/reception unit configured to transmit and receive an optical signal of data, and a data control unit configured to superimpose data transmission/reception control information related to transmission/reception of data transmitted/received by the data transmission/reception unit on the optical signal for power supply, the power receiving side optical communication apparatus comprising:

a power storage medium configured to store power obtained from the optical signal for power supply transmitted by the optical power supply unit;

a control information detection unit, including one or more processors, configured to detect the data transmission/reception control information superimposed on the optical signal for power supply;

an optical transmission/reception unit, including one or more processors, configured to transmit and receive the optical signal of the data to and from the data transmission/reception unit;

an external transmission/reception unit, including one or more processors, configured to transmit and receive the data to and from an external apparatus;

a data storage medium configured to store data that has not been transmitted to the power supply side optical communication apparatus or the external apparatus; and a data transfer control unit, including one or more processors, configured to transfer data received by the optical transmission/reception unit to the external transmission/reception unit and transfer data received by the external transmission/reception unit to the optical transmission/reception unit, the data transfer control unit being configured to calculate a data amount of data to be output to each of the optical transmission/reception unit and the external transmission/reception unit on the basis of the data transmission/reception control information detected by the control information detection unit and a data amount of the data stored in the data storage medium, output data equal to or less than a transferable data amount calculated on the basis of an amount of power stored in the power storage medium among the data of the calculated data amount to both or either of the optical transmission/reception unit and the external transmission/reception unit, and store the data exceeding the transferable data amount in the data storage medium.

7. The power receiving side optical communication apparatus according to claim 6,
wherein the data transmission/reception control information includes a scheduled transmission data amount and a receivable data amount, the scheduled transmission data amount indicating a data amount of data scheduled to be transmitted by the power supply side optical communication apparatus to the power receiving side optical communication apparatus, the receivable data amount indicating a data amount of data that is able to be received by the power supply side optical communication apparatus from the power receiving side optical communication apparatus, and the data transfer control unit is configured to calculate a data amount of data to be output to the optical transmission/reception unit on the basis of a data amount of uplink data transmitted from the power receiving side optical communication apparatus to the power supply side optical communication apparatus stored in the data storage medium and the receivable data amount, and calculate a data amount of data to be output to the external transmission/reception unit on the basis of a data amount of downlink data transmitted from the power receiving side optical communication apparatus to the external apparatus stored in the data storage medium and the scheduled transmission data amount.

8. The power receiving side optical communication apparatus according to claim 6,
wherein the data transmission/reception control information includes transmission/reception timing information indicating a timing at which the power supply side optical communication apparatus transmits and receives data, and
the data transfer control unit is configured to
read data from the data storage medium and outputs the read data to the optical transmission/reception unit at a receivable timing of the power supply side optical communication apparatus indicated by the transmission/reception timing information.

9. The power receiving side optical communication apparatus according to claim 6,
wherein, when the calculated data amount of the data to be output to each of the optical transmission/reception unit and the external transmission/reception unit exceeds the transferable data amount, the data transfer control unit is configured to allocate the data amount of the data to be output to both or either of the optical transmission/reception unit and the external transmission/reception unit within a range of the transferable data amount.

10. The power receiving side optical communication apparatus according to claim 6, wherein
a data storage device that is provided outside the power receiving side optical communication apparatus and is connected to the power receiving side optical communication apparatus, instead of the data storage medium.

11. A data transfer method performed in an optical power supply system including a power supply side optical communication apparatus and a power receiving side optical communication apparatus, the data transfer method comprising:
supplying, by the power supply side optical communication apparatus, power to the power receiving side optical communication apparatus using an optical signal for power supply;
storing, by a power storage unit of the power receiving side optical communication apparatus, the supplied power;
transmitting and receiving, by a data transmission/reception unit of the power supply side optical communication apparatus and an optical transmission/reception unit of the power receiving side optical communication apparatus, optical signals of data;
transmitting and receiving, by an external transmission/reception unit of the power receiving side optical communication apparatus and an external apparatus, the data;
recording, in a data storage unit of the power receiving side optical communication apparatus, data that has not been transmitted to the power supply side optical communication apparatus or the external apparatus;
superimposing, by a data control unit of the power supply side optical communication apparatus, data transmission/reception control information related to transmission/reception of data transmitted/received by the data transmission/reception unit on the optical signal for power supply;
detecting, by a control information detection unit of the power receiving side optical communication apparatus, the data transmission/reception control information superimposed on the optical signal for power supply; and
calculating, by a data transfer control unit that transfers data received by the optical transmission/reception unit to the external transmission/reception unit in the power receiving side optical communication apparatus and transfers data received by the external transmission/reception unit to the optical transmission/reception unit, a data amount of data to be output to each of the optical transmission/reception unit and the external transmission/reception unit on the basis of the data transmission/reception control information detected by the control information detection unit and a data amount of the data stored in the data storage unit, outputting data equal to or less than a transferable data amount calculated on the basis of an amount of power stored in the power storage unit among the data of the calculated data amount to both or either of the optical transmission/reception unit and the external transmission/reception unit, and storing the data exceeding the transferable data amount in the data storage unit.

12. The data transfer method according to claim 11,
wherein the data transmission/reception control information includes a scheduled transmission data amount and a receivable data amount, the scheduled transmission data amount indicating a data amount of data scheduled to be transmitted by the power supply side optical communication apparatus to the power receiving side optical communication apparatus, the receivable data amount indicating a data amount of data that is able to be received by the power supply side optical communication apparatus from the power receiving side optical communication apparatus, and
the method comprising:
calculating, by the data transfer control unit, a data amount of data to be output to the optical transmission/reception unit on the basis of a data amount of uplink data transmitted from the power receiving side optical communication apparatus to the power supply side optical communication apparatus stored in the data storage unit and the receivable data amount, and calculating a data amount of data to be output to the external transmission/reception unit on the basis of a data amount of downlink data transmitted from the power receiving side optical communication apparatus to the external apparatus stored in the data storage unit and the scheduled transmission data amount.

13. The data transfer method according to claim 11,
wherein the data transmission/reception control information includes transmission/reception timing information indicating a timing at which the power supply side optical communication apparatus transmits and receives data, and
the method comprising:
reading, by the data transfer control unit, data from the data storage unit and outputting the read data to the optical transmission/reception unit at a receivable timing of the power supply side optical communication apparatus indicated by the transmission/reception timing information.

14. The data transfer method according to claim 11, comprising:
when the calculated data amount of the data to be output to each of the optical transmission/reception unit and the external transmission/reception unit exceeds the transferable data amount, allocating, by the data transfer control unit, the data amount of the data to be output to both or either of the optical transmission/reception unit and the external transmission/reception unit within a range of the transferable data amount.

15. The data transfer method according to claim 11, wherein
a data storage device that is provided outside the power receiving side optical communication apparatus and is connected to the power receiving side optical communication apparatus, instead of the data storage unit.

* * * * *